United States Patent [19]

Dore

[11] Patent Number: 4,855,173

[45] Date of Patent: Aug. 8, 1989

[54] REPAIR PROCESS FOR A FIBRE REINFORCED STRUCTURE

[76] Inventor: Peter B. Dore, 57 Old Belair Rd., Mitcham, Australia

[21] Appl. No.: 230,917

[22] Filed: Aug. 11, 1988

[51] Int. Cl.[4] .............................................. B32B 35/00
[52] U.S. Cl. .................................... 428/63; 29/402.09; 138/98; 156/94; 156/98; 156/294; 264/36; 273/73 F
[58] Field of Search ................. 29/402.09, 402.11; 138/98, 99; 156/94, 98, 294; 264/36; 273/73 F; 428/63

[56] References Cited

U.S. PATENT DOCUMENTS

| | | | |
|---|---|---|---|
| 3,666,586 | 5/1972 | Lacey | 156/98 |
| 4,409,270 | 10/1983 | Faber et al. | 428/63 |
| 4,429,873 | 2/1984 | Van Raemdonck | 273/73 F |
| 4,588,626 | 5/1986 | Cologna et al. | 428/63 |
| 4,737,330 | 4/1988 | Rau | 264/36 X |
| 4,793,879 | 12/1988 | Mimbs | 156/98 |

*Primary Examiner*—Robert A. Dawson
*Attorney, Agent, or Firm*—Nixon & Vanderhye

[57] ABSTRACT

A repair process for a damaged fibre-reinforced structure, such as the frame of a sports racquet, comprises the steps of making a window in the structure across the damaged area and filling the exposed cavity at the damaged area with a combination of reinforced fibres wetted out with a curable resin, and a plug. The plug is preferably a short length of solid rod, for instance of fibre-glass and polyester material, and is packed to either side in the structure with the reinforcing fibres which may be provided by Kevlar rovings. The repair is further reinforced by a curable overlay.

20 Claims, 7 Drawing Sheets

REPAIR PROCESS FOR A FIBRE REINFORCED STRUCTURE

BACKGROUND OF THE INVENTION

1. Field of the Invention

This invention relates to a repair process for fibre reinforced structures, especially but not exclusively graphite or composite graphite structures. It finds particular application to sports equipment such as tennis, squash and badminton racquets.

2. Description of the Prior Art

Equipment which must be light but strong is commonly fibre reinforced, and may be made at least partially from graphite or composite graphite materials. This is often the case with sports racquets such as tennis racquets. The shaft, handle and strung head portion of a racquet frame may each or all be constructed out of these materials and the usual associated structure comprises a hollow shell of laminated carbon (graphite) fibres set in resin, the hollow centre being either empty or filled with a filling material such as plastics, vibration-dampening foam, timber, cork, or alloy extrusions. Sometimes, particularly in the shaft, the shell of laminated fibre may have more than one internal cavity, the shell cross section then appearing for instance as a figure-of-eight.

In the event of damage to a graphite or composite graphite structure, it is necessary to effect a repair which will at least approximately equal the strength of the unbroken structure.

According to a known technique for repairing sports racquets, the following steps are applied:

(i) if the repair is to a strung area of the racquet, the strings are removed, together with any protective plastic grommet strip;

(ii) a temporary bond is made across the fracture with cyanoacrylate glue and microsphere ballons as a filler and a check is made that the frame is straight at the fracture;

(iii) a section of the graphite material shell is cut out to form a window exposing the hollow centre and extending across and to either side of the fracture;

(iv) any foam core or other lining or filling material is carefully removed from the cavity exposed at the window;

(v) the cavity is blown free of dust, epoxy resin is painted onto the walls of the cavity and unidirectional Kevlar rovings are wet out and placed along the walls of the cavity. If the fracture is in a strung area, it is checked that no Kevlar rovings are laid across a wall of the cavity through which a string hole will have to be redrilled subsequently;

(vi) fibre glass rovings, such as those used in a chopper gun for boat construction, are inlaid until the cavity at the window is full and the fracture is left to cure overnight;

(vii) the fibreglass rovings are filed to match the outline of the original frame and paintwork is removed as far as perhaps 10–12 mm to either side of the window;

(viii) "2 oz" glass cloth, saturated with resin, is wrapped around the frame across the fracture so as to cover and provide a splint for the internal inlay, and the frame is again left to cure overnight;

(ix) the frame is again filed at the fracture, the glass cloth overlay being tapered to meet the existing frame, the frame being first rough filed then smooth filed and finally sanded;

(x) any string holes are redrilled, the frame is repainted, the grommet strip replaced and the racquet restrung.

Repair methods as described above are very time-consuming. Altogether, the process takes about three days and involves significant down time when the racquet is merely left to cure.

Also, there is a tendency for the fibreglass rovings in the cavity to swell and contract unpredictably during curing. When this occurs after the glass cloth overlay is in place, a depression or a bulge can be produced in the overlay which cannot be put right since the problem stems from underneath, in the inaccessible fibreglass rovings. The result is that quite often there is an unpredictably misshapen repair section.

SUMMARY OF THE INVENTION

An object of the present invention is to provide a repair process for fibre-reinforced structures such as graphite or composite graphite structures, particularly sports racquet frames, which is relatively quick to carry out and results in a more predictable repair quality. (The term "graphite structure" is used herein to describe either graphite or composite graphite structures.)

According to the present invention, there is provided a repair process for hollow fibre-reinforced structures, which comprises making a window in the structure across a damaged area and filling the exposed cavity at the damaged area with a combination of reinforcing fibres coated with a curable resin, and a plug. The plug may suitably comprise a short length of rod, of fibreglass and polyester materials, and is preferably a solid rod, placed centrally in the cavity. The fibres are preferably provided by Kevlar rovings.

If the graphite fibre-reinforced structure is provided with filling material, then this is removed from the cavity at the window to give access for the plug and rovings.

A repaired structure according to an embodiment of the present invention comprises a hollow fibre-reinforced structure, including a longitudinal section which has previously been damaged, there being incorporated in said section a plug, and a packing between the plug and the walls of said section, which packing is preferably of Kevlar rovings set in cured resin, the length of the plug and of the rovings extending parallel to the length of the section, which section is reinforced by a circumferential overlay of reinforcing fibres set in cured resin, the plug packing and overlay acting to repair the damage. The overlay may further include carbon rovings also extending parallel to the length of the section.

Repair processes according to the present invention can be carried out in a significantly shorter time than those of the prior art because only one resin application has to be made. The whole repair process can be carried out in a single series of operations, followed by a curing stage and finishing off, while still producing a repair of suitable strength and quality.

Following the use of reinforced fibres and a plug to fill the cavity exposed at a damaged area, the region can be immediately overlaid with glass cloth and cured, for instance for 2 to 3 hours in an oven at 50° C. Thereafter it is ready for the finishing off steps; filling, redrilling, and repainting.

As well as reducing the total curing time taken to effect a repair, processes according to the present invention also reduce time taken to file down the repair. This is because the plug reduces the total amount of fibres which are wet out and packed into the frame cavity. These fibres decompress during curing, and swell out of the cavity somewhat. By reducing the fibre quantity, the swelling out is also reduced.

Another advantage of processes according to the present invention follows from the feature of reduced swelling out. Because less material then has to be filed down, the amount of material remaining to reinforce the repair is relatively high. Hence the strength of repairs made according to the present invention tends to be improved with respect to prior art repairs.

Further features of the invention will be apparent from the following description and the accompanying drawings, all of which illustrate an embodiment or embodiments of the invention, by way of example only.

In the drawings:

FIG. 7b is a front elevation of a plug for use in the step of FIG. 7a;

DESCRIPTION OF A PREFERRED EMBODIMENT

A process for repairing a fracture in the head of a graphite or composite graphite tennis racquet frame will now be described in detail.

Figure 1:
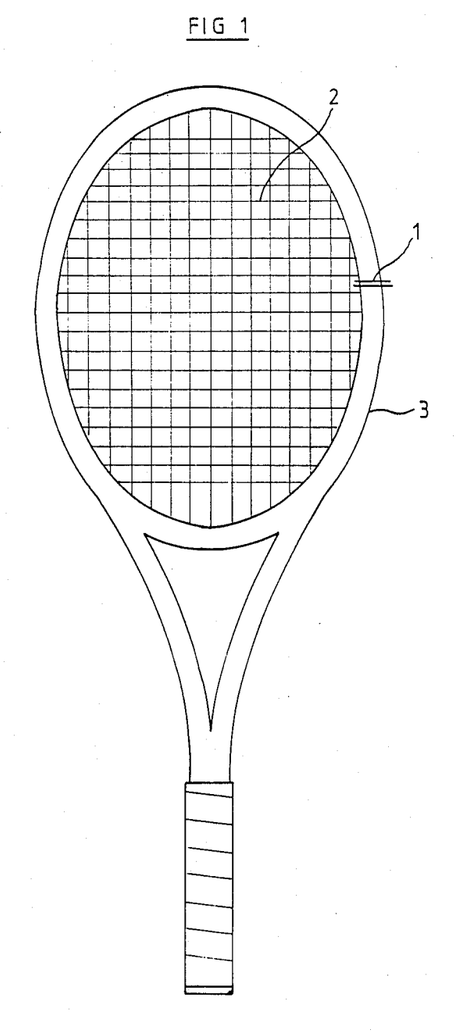
FIG. 1 is a front elevation of a tennis racquet having a fracture indicated in the head of the frame.

Referring to FIG. 1, to prepare the frame 3 for a repair to the head, firsty all the strings 2, and any protective stringing grommet (not shown) in the region of the fracture 1, are removed.

To ensure the parts of the frame 3 either side of the fracture 1 stay aligned during the repair process they are "tack glued" using a cyanoacrylate glue such as Bostik 7431. The low viscosity of this type of glue is important for the penetration of the fractured fibres, but as this glue has extremely low gap filling capabilities a microsphere filling powder is used in conjunction with the glue to provide an extremely useful temporary bond. (Bostik 7431 is commercially known as "Super glue".) Any equivalent product should have a viscosity rating of 2-8 c.p.m.

Figure 2A:
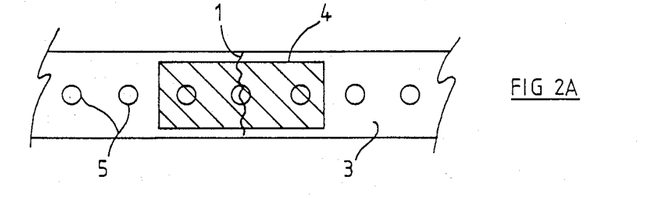
FIGS. 2a and 2b are partial views of a side elevation of the tennis racquet head in the region of the fracture, indicating the position of a window to be cut during the repair process for the case of two different types of fracture.
Figure 2B:
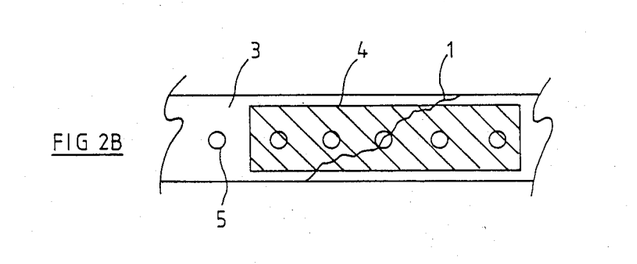

Referring to FIGS. 2a and 2b, once the frame 3 is glued and checked for alignment at the fracture 1, a window 4 is cut into the hollow shell of the frame 3 to expose the internal cavity at and adjacent to the fracture 1. To ensure sufficient strength in the repair, the fracture 1 should have support for approximately 1½ to 2 spaces between string holes 5 to either side. Hence the window 4 should be cut across the centre of the fracture 1 and to either side for that distance. Clearly, a sloping fracture 1 as shown in FIG. 2b will require support over the greater length.

Figure 3:
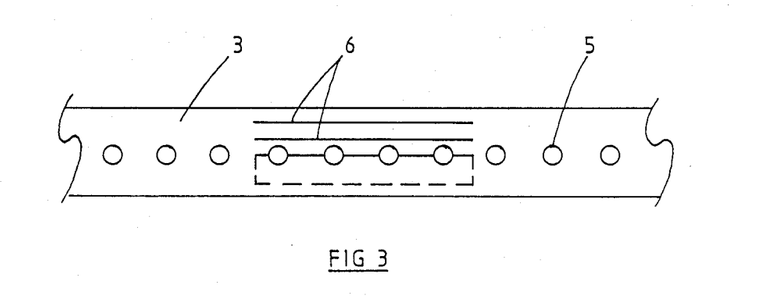
FIG. 3 is a partial view as in FIGS. 2a and 2b, showing steps in making the window.

Referring to FIG. 3, an easy method of performing this window cutting operation is by making a cut the length along the frame 3 which is required, then making a series of cuts 6 next to each other across the width of the cut. A cut of 2 mm-4 mm in depth is all that is necessary to remove the top section of frame. The ends of this cut should be square and clean as this saves a great deal of time in following stages.

All material is then cleaned from the inside of the frame 3 in the region of the window 4 until the laminations of fibres in the shell are exposed. Racquets made by a compression moulding technique will have a plastic lining inside the hollow area. Many racquets available today have foam filled cores for vibration dampening enhancement and some frames of European origin have timber, cork, or even alloy extrusions. All these must be ground out to ensure complete adhesion of the repair to the existing frame 3.

Figure 4:
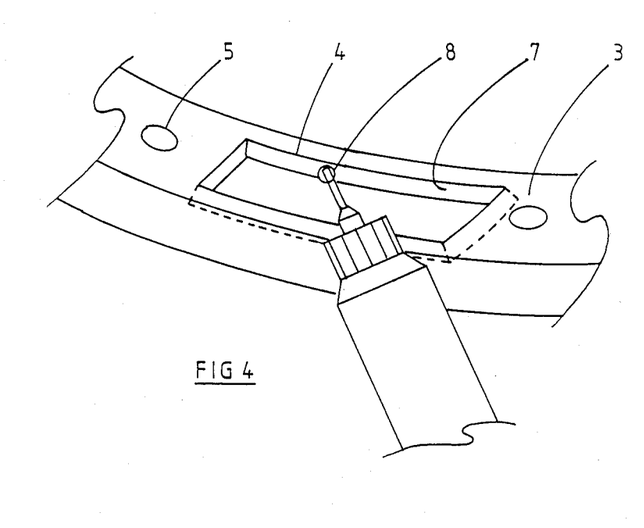
FIG. 4 is a partial perspective view of the racquet head, showing a window.

Referring to FIG. 4, to gain the greatest access to the inside of the frame 3, the edges 7 of the window 4 should preferably be tapered, for instance by using a burr 8.

Many racquets have small nodules or folds of the fibre laminations on the inside walls of the frame. These are "stress risers" within the frame that do not allow shock from impact to travel equally throughout the frame when it comes into contact with solid surfaces. They are usually the reason for a frame breaking at a particular point. These nodules should be ground away to leave a flat wall internally so the repair does not follow the original contour and a secondary stress riser result.

Figure 5:
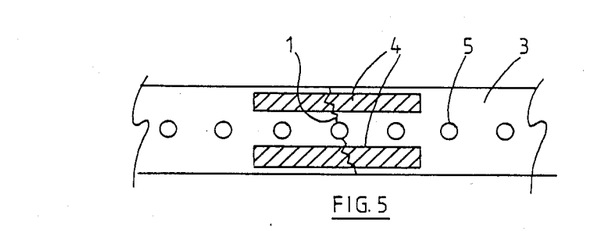
FIG. 5 is a partial side elevation of a racquet head indicating an alternative form of window.

Referring to FIG. 5, an exception to the above procedures of cutting a window is when a repair must be effected on a racquet frame 3 that is injection moulded. These frames are also hollow but the grommet (string) holes 5 are formed by hollow pillars (not shown) through the frame. A dual window 4 must then be cut either side of the grommet holes 5 to leave these pillars intact and therefore finish with the strongest possible repair.

Figure 6:
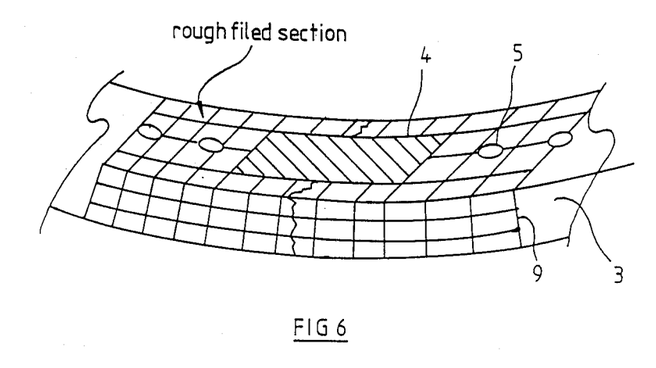
FIG. 6 is a partial perspective view of the racquet head, indicating an area over which paint and undercoat should be removed.

Referring to FIG. 6, using a rough file, gloss paint should be completely removed from the entire circumference of the frame 3, except inside the recess for the grommet strip (not shown). A distance of at least 2 cm to either side of the window should be filed. The aim is to remove all the paint and undercoat so as to leave the fibre layers exposed. No fibre material should be removed at this stage except in the case of removing protruding fibres to create a level surface. The area of the frame 3 over which paint and undercoat should be removed is indicated by the squared region shown on FIG. 6. Care should be taken to follow the contour or facets of the frame 3 so it will be easier to re-create the original shape during the final stages of repair. Generally only light pressure is needed to remove the paint layer although some frames have many thick coats up to almost 1 mm thick.

Figure 7A:
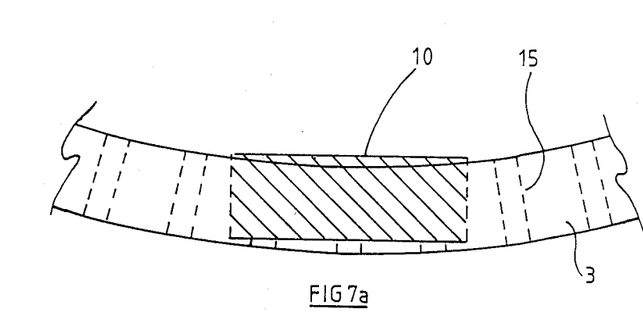
FIG. 7a is a partial front elevation of the racquet head indicating a step in the repair process.
Figure 7B:
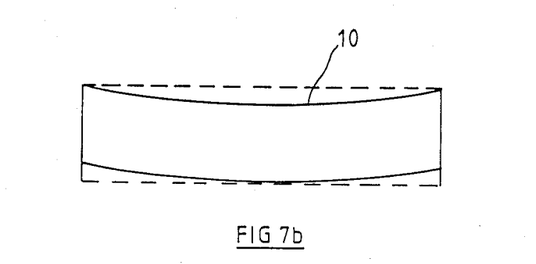

Referring to FIGS. 7a and 7b, a plug 10 is now cut to fit neatly into the window 4, and contoured to the curve, if any, of the frame 3 at the point of repair. A pre-fabricated fibreglass rod of 9 or 10 mm in diameter is ideal for this purpose. (5 mm or 6 mm diameter rod is more suitable for squash racquets.) The rod should preferably be an extrusion of uni-directional fibreglass rovings and polyester resin. The use of this particular rod does not alter the flex characteristics of the graphite composite frames which are themselves stiffer.

The plug 10 must be contoured since the rods, which are purchased in straight lengths (usually 6 m), are not flexible over a short length. A gap would otherwise be present underneath the plug 10 in the frame 3. To achieve a flush fit against the bottom of the frame 3, the ends are ground to the desired shape. The top is filed, with a rough file as previously used in removing the paint. The end result will be a plug 10 that sits neatly on the bottom of the frame 3 and does not protrude above the top or inside curve of the frame. It may be necessary to grind a flat on the sides of the plug 10 in the case of the window 4 not being the same width as the rod. Any shiny surface left on the plug 10, in spots that have not been cut or shaped, now need to be rough filed lightly so that a good key is provided for resin to adhere to.

The next step in the repair process is to prepare a glass cloth strip for use in overlaying the repair. A glass cloth that can be used for the overlay is a lightweight 2 oz. "S" or "E" glass cloth of standard cross weave pattern. A strip of cloth should be cut which is the same width as the rough filed area 9 from which paint and undercoat have been removed, that is for instance about 7 cm, and about 30 cm long.

Uni-directional "Kevlar 49" rovings (by DuPont) are now prepared for insertion to the frame. The standard Kevlar roving is bundled into strands of 15 rovings per bundle, approximately 30 cm-40 cm long and secured at one end with a short strip of masking tape, about 2.5 cm long, tightly wound. The thickness of this bundle then allows most frames to have the Kevlar applied in one easy operation rather than filling the appropriate section of the window with many thinner pieces. The best way of tightly securing the masking tape is as follows.

Figure 8A:
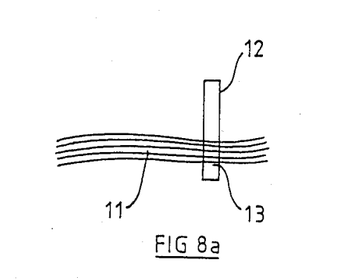
FIGS. 8a and 8b show steps in preparing roving bundles for use in inlaying the frame at the repair.
Figure 8B:
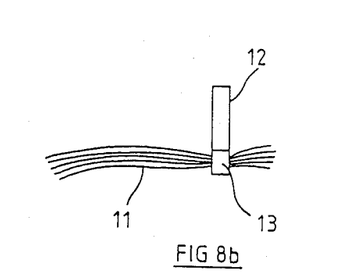

Referring to FIGS. 8a and 8b, with the rovings 11 cut evenly at both ends, a 2.5-3 cm strip of 1 cm wide tape 12 is applied off-centred as in FIG. 8a. The short end 13 is brought over so the two sides of adhesive contact each other and firm pressure is applied, as seen in FIG. 8b. The remaining tape 12 is then tightly rolled around on itself to complete the secure bundle of rovings 11. These steps are necessary so that individual strands of fibre do not get pulled out during application of resin or a "cutting to length" procedure which only creates wastage and is inconvenient.

At this stage, bundles of fibreglass rovings may also be prepared in exactly the same manner. The thickness of these bundles only need consist of 3-5 strands of rovings, as against 15 of Kevlar, to achieve a desired bundle size. Fibreglass rovings may be used when severely damaged racquets are being repaired because in these cases the plug 10 may not conform exactly to the edge of the window 4 and the role of the fibreglass rovings is to fill extraordinary gaps and ensure that the overlay conforms at least substantially to the original contour when cured. Their use is not necessary in all repairs. However it is handy to keep a length on standby because fibreglass rovings can be cut to the length of the window 4 and placed in any area of the racquet frame 3 which is badly misshapen by a fracture or, indeed, which is missing altogether.

Dust should now be blown clear of the area to be repaired and resin applied. Using a small brush, a thick layer of resin should be painted into the inner surface of the frame 3 via the window 4. A length of Kevlar rovings 11 is cut to the same length as the window 4. Resin is then forced through the fibres, with the brush, until completely "wet out" or saturated. Excess resin should however be squeezed from the length of rovings 11 back into a container. The wet end of the bundle of rovings 11 should then be inserted into the side of the frame 3 then the dry end fed in while being worked against the frame wall with a wet brush This must be duplicated on the other wall of the frame 3.

Figure 9:
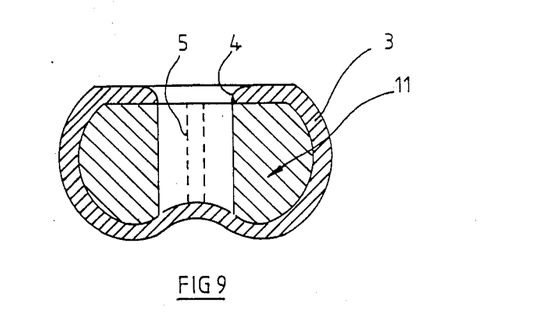
FIG. 9 is a cross section of the racquet head in the region of the repair after inlaying with Kevlar rovings.

Referring to FIG. 9, the Kevlar rovings 11 are inlaid at the fracture to fill the frame 3 to either side of the window 4, leaving a gap in the middle which will receive the plug 10. (Neither the plug 10 nor the ends of the individual rovings 11 are shown in FIG. 9.)

The plug 10 is now painted with resin and inserted into the window 4 so as to entirely fill the gap between the two sets of Kevlar rovings 11, flush with the original racquet frame. If any part of the plug 10 sits proud of the frame 3 it should be filed flush before proceeding, as problems will otherwise be encountered when redrilling the stringing holes 5. When all the rovings 11 are thoroughly wet out and the plug 10 is a neat fit in the window 4, the rough filed section 9 can be painted with resin.

Figure 10:
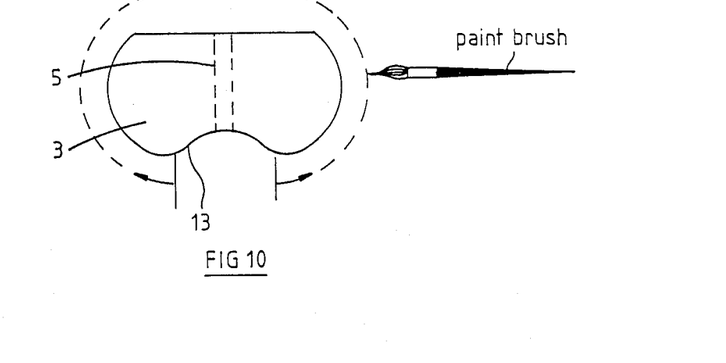
FIG. 10 indicates the extent to which resin should be applied to the outside surface of the cross section of FIG. 9.

Referring to FIG. 10, the resin should be painted from one edge of the grommet strip recess 13, around the side, up over the top and down to the other edge of the grommet strip recess 13.

The repair is then overlaid with the prepared glass cloth strip. The strip is wound round the repair area repeatedly while applying resin, the strip being pulled to ensure sufficient saturation of resin. It is important not to apply too much resin at this stage, which would weaken the "splint" provided to the repair by the overlay. Ideally, during overlay, the cloth should be clear rather than white which indicates dryness, but no layer or film of wet resin should be seen to "sag" on the surface. The entire circumference of the overlay should be wet-out, including the section which bridges the grommet strip recess 13.

The cloth is easier to wet-out by forcing resin up through from layers beneath, than by trying to force resin down through the cloth to the layers below. It is therefore advisable to apply slightly more resin on the initial 2 or 3 layers and thin out or use what resin is squeezed through when pulling evenly on the cloth during the final layer or two.

Figure 11:
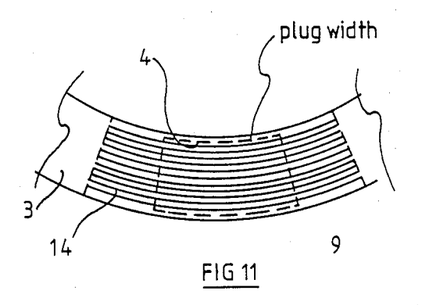
FIG. 11 indicates the position of unidirectional carbon fibres in a fibre glass cloth overlay in the repair process.

Referring to FIG. 11, an amount of uni-directional carbon fibre 14 is included into the overlay to increase the amount of support and match the original flex characteristics that the repair should provide. (It should be noted that individual fibres are not shown in the Figure which merely indicates the general layout of the fibres.)

The carbon fibre 14 is best placed on the sides of the frame 3 during the second layer to mid-way stage of the overlay and always placed with the direction of the fibre running around the frame 3 as indicated in FIG. 11. As the carbon is a much harder substance to file than the fibreglass cloth it is best to keep it "hidden" approx. ½ to 1 cm back from each end of the overlay along the frame 3. It should however be applied so that it passes both ends of where the window 4 corresponds to on the top of the frame 3.

Suitable forms of carbon fibre, such as a carbon fibre fabric, for use in the overlay as described are known. The modulus that a uni-directional medium in carbon can impart in the uni-direction or chosen direction, for its weight, can be far superior to other fibre media available. The material contours well but care should be taken during wet-out to ensure that true wet-out has taken place.

When the entire length of cloth is wrapped around the frame a plastic tape is applied to firmly bind and bed down the cloth and resin as a truly integrated structure. A non-adhesive tape, approx. 2 cm wide, commonly called grafting or budding tape in the horticultural industry, is ideal for this purpose as it stretches well but has no adhesive to interfere with the resin or cloth. The tape should be started right next to the overlay and doubled over on itself to stop it slipping around as it is pulled tightly on subsequent revolutions. Approximately half of its width should be overlapped as it is wound. About 15 cm extra should then be pulled off the roll and a single knot tied around the frame with this long end. A second knot may be needed to secure the tape from slipping on the wet resin. The repair itself is now completed apart from the final finishing stages.

The resins are preferably of a type to be post cured by heating in an oven at 45° to 65° C., or more preferably at 50° to 60° C. for two to three hours. This enhances the strength of the finished product which will be evident in repairs which are able to withstand more punishment than the rest of the frame.

Resin suitable for use in processes as described above include the resin and hardener, numbered XB 3052 A and XB 3052 B respectively, distributed in Australia by CIBA - GEIGY Australia Limited. These offer a low viscosity, solvent free, cold and warm curing, laminating system, which is suitable for production of high stressed fibre reinforced structures. The properties of the resin and hardener are given in Table 1.

TABLE 1
PROPERTIES OF RESIN AND HARDENER

| | | XB 3052 A | XB 3052 B |
|---|---|---|---|
| Aspect at room temperature | | liquid | liquid |
| Colour number (Gardner-Holdt) | | ≦3 | ≦3 |
| Viscosity at 25° C. | mPas | 1000–1500 | 40–60 |
| Specific gravity at 25° C. | g/cm$^3$ | 1.16–1.18 | 0.93–0.95 |
| Epoxy content | aeq./kg | 6.6–6.9 | — |
| Amine content | aeq./kg | — | 9.7–9.9 |
| Active hydrogen equiv. weight | aeq./kg | | 19.4–19.8 |
| Flash point (Pensky-Martens) | °C. | 140–150 | 110–115 |

For use, the resin and hardener should be mixed in the ratio 100 to 38 parts by weight, the tolerances being ±1.0 and ±0.5 respectively.

After the racquet has completely cured, the plastic tape can be removed and discarded. Just the bridging section of the fibreglass cloth is then removed by filing to once more gain access to the grommet strip recess 13.

Figure 12:
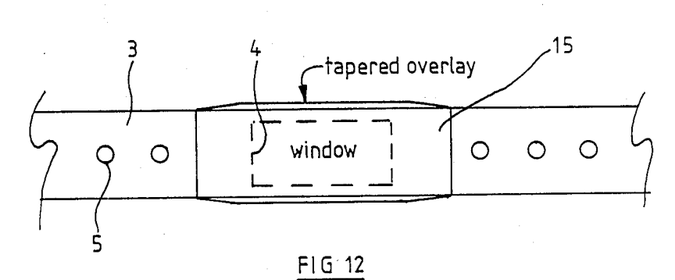
FIG. 12 is a partial side elevation of the racquet head after a repair has been completed.

Referring to FIG. 12, the repair area is then rough filed to regain approximately the original contour of the frame 3, although the repair area will be thickened. The ends of the fibreglass cloth overlay 15 should be tapered back to the original frame 3, the taper not starting however at any position overlying the window 4. Large amounts of the cloth overlay 15 should not be removed, only large imperfections being levelled.

A build up or thickening can be left on the frame to improve the "splint" effect offered by the carbon/glass overlay. However, the position of this build up can be selected to correspond to where the strength will be most important during use of the racquet.

The last stages of the repair are to smooth file and sandpaper the frame 3, redrill the string holes 5, and paint the repair area, before replacement of the grommet strip and restringing. These are all relatively standard process steps and will not be described in detail. It should be noted however that after drilling, the rough ends of fibre pushed out by the drill bit should be removed.

Although the repair process of the present invention has been described with respect to the head portion of a frame, it may be that it is the shaft which has cracked or broken. The shaft is commonly manufactured to have a hollow shell whose cross section is divided by an internal wall of the same material to form a double cavity. It may be necessary in repairing a shaft to take account of this structure when cutting a window into the shell since damage to the internal wall should be avoided.

Cracks as well as fractures can be repaired by a repair process as described above.

Where other structures are to be repaired, for instance badminton or squash racquets, features of the process may be modified accordingly. In particular, the dimensions applied in the process, such as the depth of the cuts to make the window, may be varied.

There are innovations in the process described above, with respect to the prior art, in addition to the use of a plug in filling the cavity. These innovations contribute to achieving a good repair by means of the process. They comprise in particular the use of unidirectional carbon fibre rovings in the initial layers of the fibreglass cloth overlay, and the use of a non-adhesive tape such as horticulturalists' grafting tape to bind the repair during curing. The use of the rovings acts to recreate the original external stiffness of a frame while the use of the grafting tape gives a smoother surface which accelerates hand finishing by file.

We claim:

1. A repair process for repairing damage in a fibre-reinforced structure having an internal cavity, which process compises the steps of:
   (a) making a window in the structure to access at least a part of the cavity at the site of the damage;
   (b) filling the cavity at the site of the damage with a combination of reinforcing fibres coated in a curable resin, and a plug;
   (c) covering the window with a curable overlay; and
   (d) curing the structure.

2. A repair process according to claim 1 wherein the fibres are provided by Kevlar rovings, the rovings and the plug extending across the site of the damage.

3. A repair process according to claim 1 wherein the fibre-reinforced structure comprises a hollow, longitudinal portion whose inner surface defines at least part of the internal cavity, the longitudinal portion having a filling material therein, and step (b) of the process is preceded by a step in which filling material is removed from the internal cavity by means of the window so as to expose said inner surface in a region comprising the site of the damage.

4. A repair process according to claim 1 wherein the plug is positioned centrally in the cavity, the fibres providing a packing between the plug and the sides of the structure.

5. A repair process according to claim 1 wherein the fibre reinforced structure comprises a graphite fibre frame of a sports racquet.

6. A process according to claim 1 wherein the plug comprises a length of solid rod.

7. A repair process according to claim 1 wherein the curable overlay comprises layers of a fibre glass cloth, the layers of the overlay which lie closer to the cavity of the structure having unidirectional carbon rovings incorporated therebetween so as to extend individually across the damaged area.

8. A repair process according to claim 1 which further comprises the step of binding the curable overlay with non-adhesive tape prior to curing the structure.

9. In a process for repairing a structure having an internal cavity, the structure incorporating fibre reinforcing material, which process comprises the steps of:
 (a) securing the structure at the site of the repair;
 (b) making a window in the structure to access the internal cavity at the site of the repair;
 (c) filling the cavity at the site of the repair by means of unidirectional fibres coated in a curable resin, which fibres extend across the site of the repair;
 (d) overlaying the structure at the site of the repair, by the use of a curable material; and
 (e) curing the structure,
the improvement comprising the modification of step (c) by filling the cavity at the site of the repair by means of a combination of coated, reinforcing fibres and a plug of material, both the fibres and the plug extending in a common direction across the site of the repair.

10. A process according to claim 9 wherein the internal cavity of the structure is at least partially defined by an inner surface of the structure, the internal cavity is at least partially filled with filling material at the site of the repair, and step (c) is preceded by a step in which filling material is removed from the internal cavity at the site of the repair by means of the window so as to expose the inner surface of the structure at said site.

11. A process according to claim 9 wherein said plug comprises a length of solid rod.

12. A process according to claim 9 wherein said plug comprises fibreglass and polyester materials.

13. A process according to claim 9 which comprises only a single curing step (e).

14. A process according to claim 13 wherein the curing step (e) is carried out at a temperature in the range from 45° to 65° C.

15. A process according to claim 9 wherein the reinforcing fibres are provided by rovings of Kevlar material.

16. A repair process for a hollow fibre-reinforced structure which has suffered damage, comprising the steps of making a window in the structure at the site of the damage, filling the cross section of the hollow structure at said site with reinforcing material, at least part of which is curable, overlaying the hollow structure at said site with curable reinforcing material, binding the overlaid reinforcing material with a non-curable and non-adhesive tape, and curing the structure.

17. A repaired fibre-reinforced structure, comprising a hollow longitudinal section having an inner surface which at least partially defines a cavity extending axially along the section, wherein said section comprises a plug, situated in the cavity so as to extend axially along the section, and a packing of reinforcing material between the plug and said inner surface, the section being further reinforced by an overlay of reinforcing material, which overlies the plug.

18. A structure according to claim 17 wherein the plug comprises a length of solid rod.

19. A structure according to claim 17 wherein said packing comprises reinforcing fibre rovings which extend axially along the section, set in cured resin.

20. A structure according to claim 17 wherein said reinforcing material is provided by Kevlar rovings.

* * * * *